Feb. 11, 1947.                 H. L. SULAK                    2,415,613
                    VENTING COVER FOR COOKING UTENSILS
                          Filed June 16, 1944
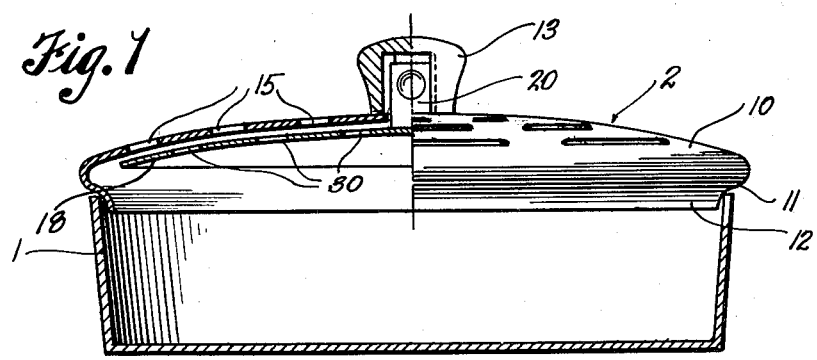
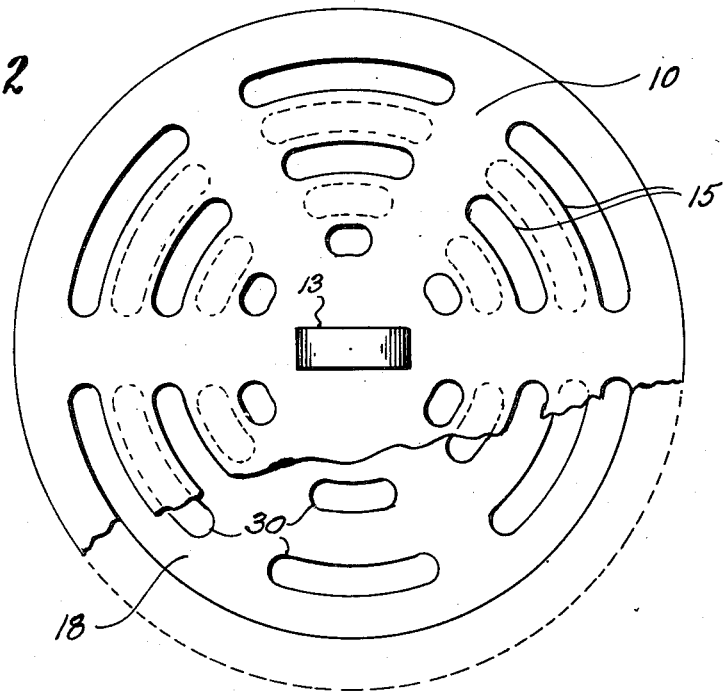
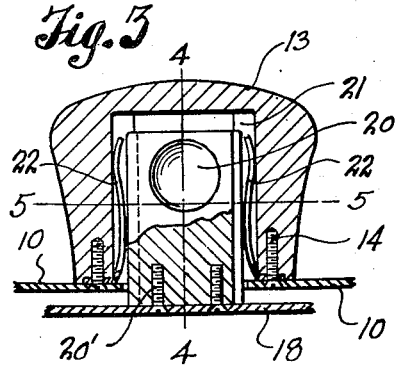
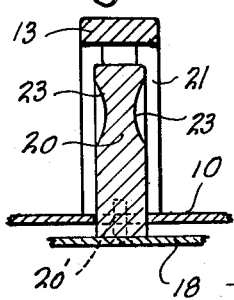
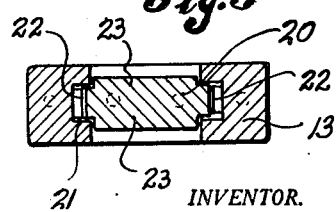
INVENTOR.
HAROLD L. SULAK
BY Cook & Robinson
ATTORNEYS Patented Feb. 11, 1947

2,415,613

UNITED STATES PATENT OFFICE 2,415,613

VENTING COVER FOR COOKING UTENSILS

Harold L. Sulak, Seattle, Wash.

Application June 16, 1944, Serial No. 540,606

1 Claim. (Cl. 220—44)

This invention relates to improvements in cooking utensils and it has reference more particularly to an improved form of cover or lid for application to such utensils as skillets and pots when used for the frying or cooking of meat and the like; it being the principal object of the invention to provide a cover or lid for the selected utensil equipped with outlets or passages for ready outflow of steam during the cooking operation, and having a closure member associated therewith that is adjustable to positions for controlling the escape of steam and flow of air through said outlets or for completely closing the outlets when it is desired to retain the steam.

It is also an object of this invention to provide a cover or lid of the character and for the purpose above stated wherein the adjustable closure member operates as a valve member and is in the form of a plate or disk, and underlies the cover, and is equipped with a support that extends upwardly therefrom, passing through a knob that is fixedly applied to the lid and is there equipped with an adjustable means for the adjustment of the closure member between fully opened and closed positions.

Still another object of the invention is to provide a lid or cover of the kind previously stated, wherein the closure member thereof also has passages therein to provide for a freer or better exit of steam, but which are offset from those in the lid proper in order that there will be no direct passages through which hot grease from the skillet or pan can be spattered.

Still another object of the invention resides in the provision of novel means for the support and adjustment of the closure member, and whereby an easy and quick disassembly of parts for cleaning is made possible.

Other objects of the invention are to be found in the details of construction of parts embodied in the cover, in their relationship and mode of use, as will hereinafter be fully described.

In accomplishing these and other objects of the invention, I have provided the improved details of construction, the preferred forms of which are illustrated in the accompanying drawing, wherein—

Fig. 1 is a side view partly in section of a cooking utensil cover, or lid, embodied by this invention, as applied to a skillet.

Fig. 2 is a top or plan view of the lid, a part being broken away for better illustration.

Fig. 3 is a cross sectional detail of the knob and adjustable support for the lid closure.

Fig. 4 is a section on line 4—4 in Fig. 3.

Fig. 5 is a horizontal section on line 5—5 in Fig. 3.

First it may be stated that the present cover or lid is intended primarily to facilitate the cooking of food and to insure better and quicker cooking with a minimum loss of heat and a better control of cooking conditions, such, for example, as the retaining of steam or vapors to the extent that a better flavor or better tasting food product results. Furthermore, it has in mind to provide for the conserving of cooking materials, such as butter or lard when used in frying.

Referring more in detail to the drawing—

1 designates a typical cooking utensil. For purpose of explanation, it may be an ordinary form of skillet as used for the cooking and frying of meats, vegetables and the like, and 2 designates, in its entirety, a lid or cover functionally applied to the skillet and embodying the improvements of the present invention.

While I have not herein so illustrated it, the lid or cover 2 could likewise be applied to pots or pans of those kinds generally used for cooking, and it is to be understood that I do not intend that use of the lid be restricted or confined to any particular type or kind of utensil or to the cooking of any particular kind or character of food, but rather that it be applied wherever useful or applicable.

The lid 2, as here shown, comprises a circular, upwardly curved body or disk 10 that is somewhat larger in diameter than the skillet 1, and formed entirely about its peripheral portion with a downwardly and inwardly curved portion 11, adapted to rest upon the top edge of the side walls of the skillet, as seen in Fig. 2. This portion of the lid has a downwardly extended peripheral flange 12 that projects down into the skillet, closely within its side walls, and thus serves to keep the lid properly in place on the skillet, and operates as a drip flange to keep condensed moisture from running to the outside of the skillet wall.

It will here be mentioned that the lid preferably would be made from sheet metal, such as sheet steel or aluminum, but might be any other suitable material.

At the center of the upwardly arched lid, is a knob 13 fixed securely in place by counter sunk screws 14 applied through the lid from the under side, threading into a central opening in the lid, or by other suitable means. About the knob the lid is formed with one or more circular, concentric and spaced apart rows of slots 15 for the ready and unrestricted outflow of steam from the utensil to which the cover is applied during a food cooking operation.

Disposed beneath the lid, parallel therewith, is an adjustable closure plate 18 that operates as a control valve member for the cover openings. This plate is circular in form and of the same curvature as that of the lid, so that it may be drawn flatly thereagainst when it is desired to close off the flow of steam or heated air through the slots 15. For its support and adjustment the plate 18 is equipped centrally with a rigidly attached, upwardly extended stem 20, held by countersunk screws 20', that slides freely up and down in a guideway 21 formed vertically in the knob 13. The channel is open to the opposite sides of the knob and is relatively wide, and provides easy access to the contained portion of the stem 20 which serves as a means for effecting adjustment of the closure plate 18 from and toward the under side of the lid 10.

Preferably the knob 13 and stem 20 would be molded of a plastic material, but might be of metal or other suitable material. The block 20 is guided freely in an up and down movement in channel 21 and in order that the closure 18 may be held at any set position of adjustment, I have interposed leaf springs 22 in the guideway between the opposite edges of the stem and guideway surfaces. These springs bear against the stem with sufficient pressure to hold it at any set position, yet permit an easy up or down movement of the stem within the knob channel.

To facilitate actuation of the stem, it is equipped in opposite faces with depressions 23 to receive the fingers. The sectional view, Fig. 5, shows the knob to be open at opposite sides and the stem 20 exposed for this adjustment.

To separate the parts 10 and 18 for cleaning, it is only necessary to pull them apart; the stem passing downwardly from the knob.

When the closure member 18 has been adjusted to a position tight against the under surface of the lid 10, it closes all passages 15 and thus cuts off all outflow of steam and heated air from the utensil. When it is open, the outflow of steam and hot air is as indicated by Fig. 1.

The closure plate 18 likewise is formed with a plurality of circular concentric rows of slots 30, but these are so located therein as to be out of registration with those of the lid 10 when the closure is in closed position. Thus when the closure is in its open position, there can be easy outflow of air or steam, but no direct passages through which grease might spatter from the frying or cooking food. The provision of slots in the closure member 18 makes for easier and more direct outflow of steam than if all steam had to pass upwardly across the peripheral edges of this member.

It is to be understood that such lids could be made in various sizes. Also that they might be of different designs than here shown, without departing from the spirit of the invention. That is, they might be flat, upwardly arched as shown, or even downwardly dished. Likewise they might be rectangular, round, oblong or of other special shape to meet a certain requirement. Likewise, handles or devices other than here shown might be employed for the purpose of raising or lowering the closure plate 18 against and from the lid 10. Therefore, it is not desired that the claims which terminate this specification, be limited to details, but that they be given an interpretation commensurate with the scope of the invention that has herein been disclosed.

Having thus described my invention, what I claim as new therein and desire to secure by Letters Patent is—

A lid of the character described comprising an upwardly arched body portion with a peripheral seat and flange for engaging the rim of a cooking utensil to retain the lid properly seated thereon, said body portion being formed with steam escape openings symmetrically located therein about its center and with an opening at the center, a knob fixed to the lid centrally thereof, a closure plate fitted to the under side of the lid, to cover said openings, and having openings therein offset from those of the lid; said knob having a vertical guideway therein open to opposite sides of the knob and registering with the center opening of the lid, and said closure plate having a step fixed thereto for adjusting the closure plate and extended upwardly and slidably contained in the knob guideway, springs fixed in the knob guideway to bear yieldingly against the stem to retain the closure plate at its different positions of adjustment against or spaced from the lid.

HAROLD L. SULAK.

REFERENCES CITED

The following references are of record in the file of this patent:

UNITED STATES PATENTS

| Number | Name | Date |
|---|---|---|
| 2,219,498 | Steyaert | Oct. 29, 1940 |
| 1,228,150 | Wass | May 29, 1917 |
| 626,808 | Gurney | June 13, 1899 |
| 1,862,778 | Vought | June 14, 1932 |
| 616,883 | Bowers | Jan. 3, 1899 |
| 1,149,289 | Post et al. | Aug. 10, 1915 |
| 2,187,154 | Ingersoll et al. | Jan. 16, 1940 |
| 1,372,827 | Popelka | Mar. 29, 1921 |